Sept. 17, 1963 J. R. WILKINSON 3,103,990
HYDRAULIC DISC BRAKE
Filed Nov. 1, 1960 2 Sheets-Sheet 1

INVENTOR.
JOHN R. WILKINSON
BY
Christie, Parker e Hale
ATTORNEYS.

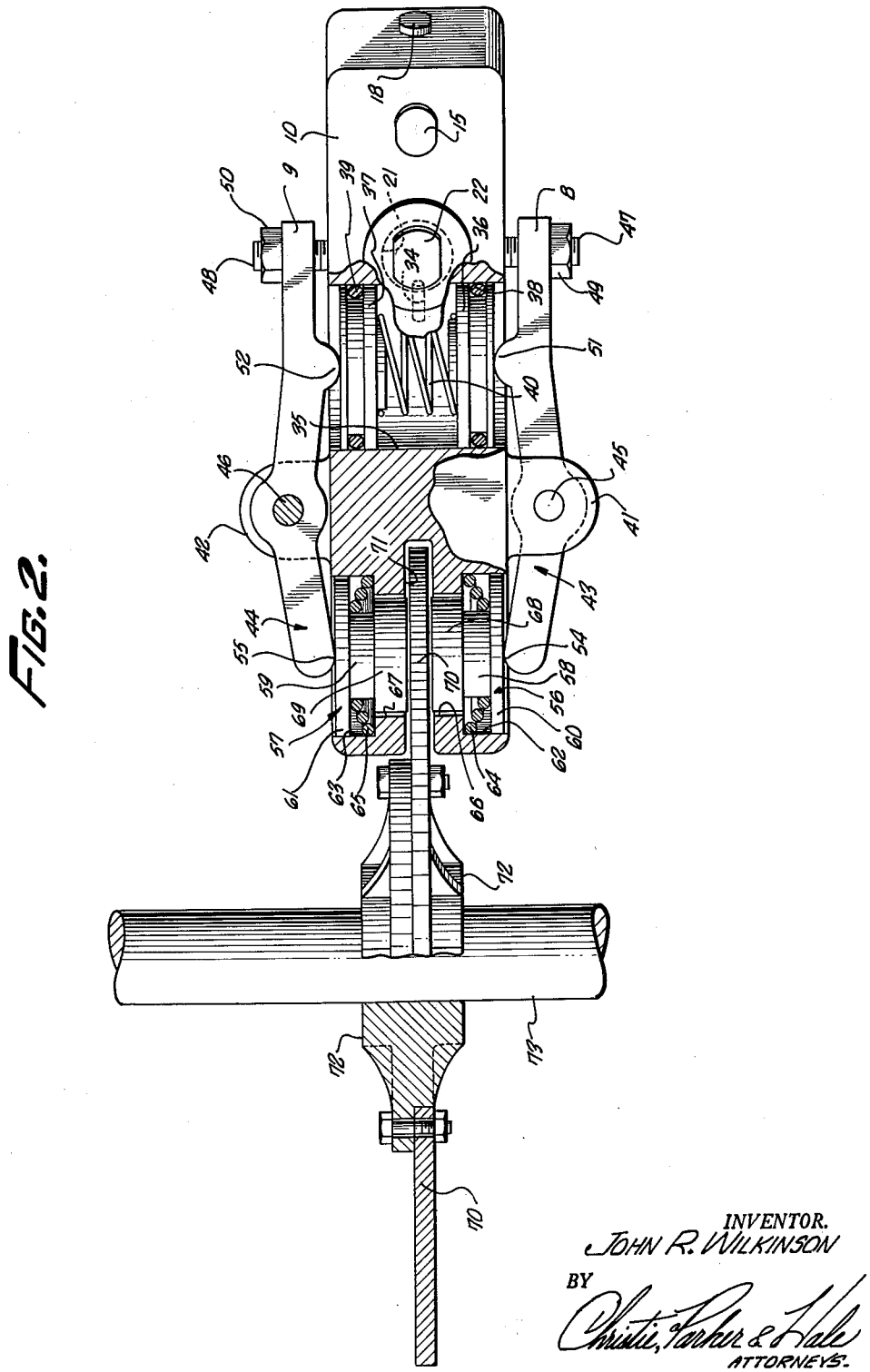

3,103,990
HYDRAULIC DISC BRAKE
John R. Wilkinson, West Covina, Calif., assignor to Thomas J. Pierson and Faye M. Pierson, West Covina, Calif.
Filed Nov. 1, 1960, Ser. No. 66,555
3 Claims. (Cl. 188—73)

The invention relates to disc brakes, and particularly to a hydraulic spot disc brake.

The invention embodies a hydraulic disc brake which is simple in construction and reliable in operation and which provides floating brake shoes and equal actuation of the brake shoes. The floating feature of the brake shoes equalizes wear over the braking surfaces of the shoes and thus tends to eliminate the necessity for premature replacement of the shoes and also tends to reduce flutter of the brake disc which may result from unevenly worn brake shoes engaging the brake disc. The equal actuation of brake shoes disposed on each side of the brake disc reduces deflection of the brake disc during braking and thus minimizes cold working and permanent deformation of the disc as well as flutter of the disc during braking and fatigue failure thereof. The inventive apparatus is particularly useful in midget racing vehicles, commonly known as "karts," which require a high efficiency, reliable, and relatively inexpensive brake.

The inventive apparatus will now be described broadly. A brake housing has a pair of spaced legs defining a slot in which is received a brake disc which is fixed to and rotates with a rotatable shaft or axle to be braked. In each leg of the housing is a cylindrical bore which receives a cylindrical brake shoe on each side of the brake disc. The brake shoes are aligned and are freely disposed in their receiving bores so that they are free to rotate or "float" in order to distribute wear over their braking surfaces. Each brake shoe is operatively connected to an end of a different one of a pair of actuating levers, and each actuating lever is pivotally mounted on the housing and has a portion near the other end engaging one of a pair of opposed pistons in a hydraulic actuating cylinder in the housing. The pistons in the actuating cylinder are in turn actuated by a master hydraulic cylinder and piston in the housing. When the brake is applied, brake liquid in the master cylinder is compressed, which in turn compresses liquid in the actuating cylinder. This causes outward displacement of the portions of the actuating levers engaging the pistons in the actuating cylinder and thus inward displacement toward each other of the other ends of the actuating levers, thereby displacing each brake shoe toward the other an equal amount to urge the brake shoes against the brake disc and frictionally engage it. The connection between the brake disc and the shaft on which it is mounted is effected by means of a special hub which reinforces the disc and minimizes its deflection.

The invention will be understood from a reading of the following description thereof taken in conjunction with the accompanying drawings, in which:

FIG. 2 is a top view along the line 2—2 in FIG. 1, partially broken away; and

Figure 1:
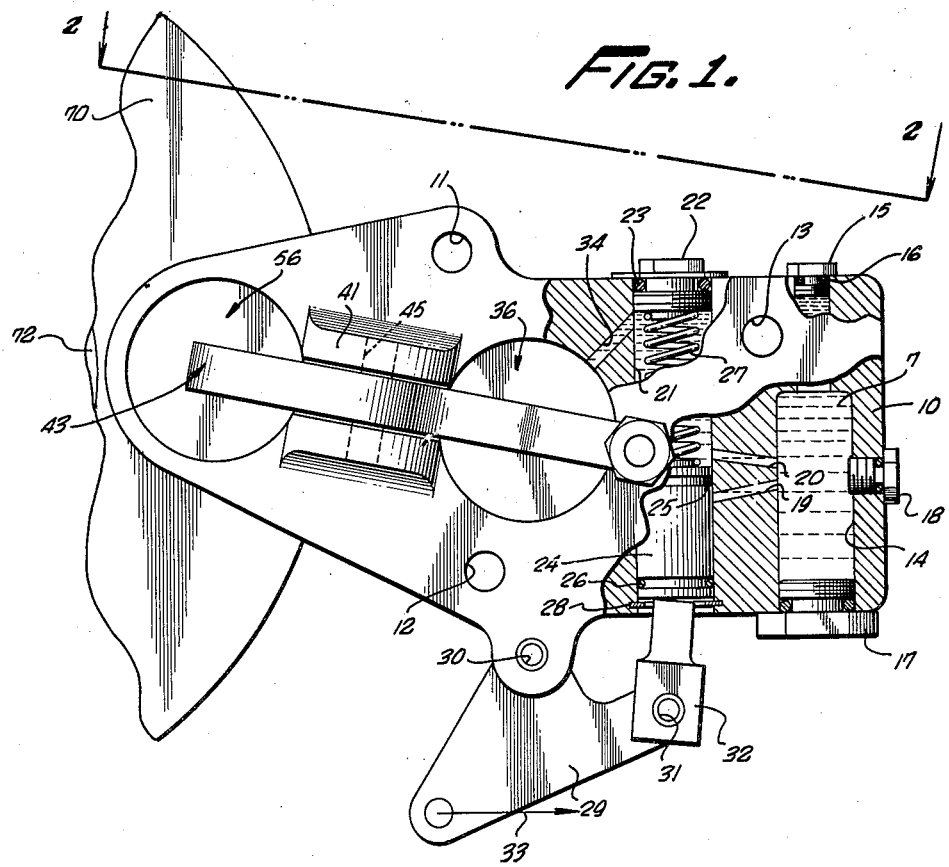
FIG. 1 is a side view of the apparatus, partially broken away.
Figure 3:
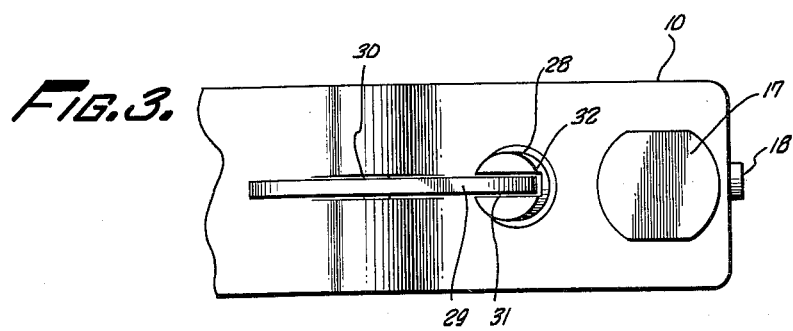
FIG. 3 is a fragmentary bottom view of the apparatus shown in FIG. 1.

Referring now to FIG. 1, 10 designates a brake housing. The brake housing 10 has transverse holes 11, 12, and 13 through which bolts may be extended to attach the brake to the frame of a vehicle. At one end of the brake housing is an internal chamber 14 which extends upwardly to a cap 15 threadedly received in the chamber with an O-ring 16 to seal the chamber 14. All of the O-rings described herein are made of neoprene material, which have been found to perform satisfactorily the functions described for the various O-rings. A drain plug 17 similar to the cap 15 but larger in size is threadedly received in the bottom of the chamber 14, and an inspection plug 18, similar to the cap 15, is threadedly received in a hole communicating with the chamber 14 adjacent to passageways 19 and 20. The plugs 17 and 18 each have an O-ring to effect a seal between the plug and the chamber 14. Hydraulic brake fluid 7 is disposed in the chamber 14 up to the level of the cap 15 and passes through the passageways 19 and 20 into a master cylinder.

The master cylinder is a cylindrical bore 21 extending vertically through the housing. The bore 21 is sealed at its top with a cap 22 threadedly received in the bore and having an O-ring 23 to effect a fluid seal between the cap and the bore. A piston 24 is slidably received in the bore 21 and has neoprene O-rings 25 and 26 adjacent its top and bottom, respectively, disposed in annular grooves to effect a liquid seal between the piston and the bore 21, but permitting sliding motion of the piston 24 in the bore 21. A compression spring 27 is disposed within the bore 21 coaxially with the piston 24 in slightly compressed condition with one end engaging the interior end of the cap 22 and the other end engaging the interior end or top of the piston 24. The compression spring 27 biases the piston 24 downwardly against C-ring 28 disposed in an annular groove in the bore 21 which serves as a stop. The compression spring 27 functions to return the piston 24 to unactuated position when the brake is released.

The piston 24 is moved vertically within the bore 21 by means of bell crank 29 pivotally mounted on the housing at 30 and having one arm pivotally attached at 31 to a piston rod 32 which bears against the outside end or bottom of the piston 24. The passageway 20 communicates with the bore 21 at a point just above the interior end of the piston 24 in its unactuated position as shown. When the piston 24 is actuated by moving it upwardly, it passes the passageway 20 and acts as a valve to close such passageway so that communication between the chamber 14 and the bore 21 is closed. The passageway 19 is an air bleed. As shown in the drawings, the closed end of the bore 21, as defined by the interior end of the cap 22, is disposed vertically slightly below the closed end of the chamber 14, as defined by the interior end of the cap 15, so that when the piston 24 is in unactuated position, brake fluid from the chamber 14 passes through the passageway 20 and completely fills the bore 21 between the interior end of the piston 24 and the interior end of the cap 22. When the bell crank 29 is moved in the direction indicated with the arrow 33, the piston 24 is moved upwardly, and when the bell crank 29 is released, the compression spring 27 returns the piston 24, piston rod 32, and bell crank 29 to their normal unactuated positions as shown. Hydraulic fluid from the master cylinder passes through a passageway 34 in the housing into an actuating cylinder.

The actuating cylinder is comprised of a cylindrical bore 35 extending transversely through the housing which is of larger diameter than the bore 21 of the master cylinder. Adjacent each end of the bore 35 are pistons 36 and 37, respectively, which each have an annular groove in which an O-ring 38, 39, respectively, is received to effect a sliding liquid seal between each piston and the bore 35. A compression spring 40 is disposed coaxially with the pistons 36 and 37 in slightly compressed condition between and bearing on the opposed inside ends of such pistons and biases the pistons apart and outwardly. The passageway 34 communicates between the bore 21 and the bore 35 from a point adjacent the closed end of bore 21 to a point in bore 35 located between the pistons 36, 37. Bore 35 is disposed in the housing at a lower level than the closed end of bore 21 so that brake fluid from bore 21 flows into the space in bore 35 between pistons 36 and 37 and completely fills such space.

On each side of the exterior of the housing is a pair of spaced lugs 41 and 42, respectively. An actuating lever 43, 44 is disposed between the lugs of each pair of lugs 41, 42, respectively, and pivotally attached to the lugs by means of a pivot pin 45, 46, respectively, secured to the lugs in conventional manner. The pivot axis of each actuating lever 43, 44 extends transverse to the extent of the lever and to the axis of the bore 35, and the pivot axes of the two actuating levers are aligned transversely of the housing. The pivot axes are also located on the housing 10 at a point between the bore 35 and the greatest extent of the slot 71 into the housing, as shown clearly in FIG. 2, this being advantageous because there is then no tendency for the legs of the fork on each side of the slot 71 to be deflected apart, and thus throw out of alignment the structure mounted in the legs and described below, when the brake is actuated. The actuating levers 43, 44 extend from their respective pivot pins past the actuating cylinder and the pistons 36, 37 therein to end portions 8, 9, respectively, overlying the housing. Each end portion 8, 9 of each actuating lever 43, 44 threadedly receives an adjustment screw 47, 48, respectively, which each extend through the actuating lever and bear on the side of the housing and have a lock nut 49, 50, respectively, threaded thereon to engage the actuating lever and jam the threaded engagement between the adjustment screw and the actuating lever in order that a predetermined adjustment of the adjustment screw will be maintained. Between the adjustment screw and the pivot pin on the actuating levers 43, 44 are arcuate projections 51, 52, respectively, which extend inwardly from the lever and bear centrally on the exterior surface of pistons 36, 37, respectively. The actuating levers 43, 44 extend forwardly from their respective pivot pins to rounded ends 54, 55, respectively, which centrally engage actuating pistons 56, 57, respectively.

The actuating pistons 56, 57 have central cylindrical portions 58, 59, respectively, from which concentric circular flanges 60, 61, respectively, extend. The actuating pistons 56, 57 are slidably received within transverse coaxial cylindrical bores 62, 63, respectively, in the housing. The pistons 56 and 57 are aligned coaxially with each other along an axis transverse to the housing 10. Cone springs 64, 65 are disposed between flanges 60, 61, respectively, and the interior bottom of the bores 62, 63, respectively. The cone springs are coaxial with the actuating pistons. When the actuating pistons are urged inwardly, the cone springs operating with the pistons are compressed and function to return the pistons outwardly to their normal unactuated position when braking action is released. Cylindrical bores 66, 67 of smaller diameter than the actuating piston bores extend coaxially from the actuating piston bores 62, 63, respectively, to the vertical slot 71 in the housing which forms a fork in the housing with the bores 62 and 66 in one leg of the fork and the bores 63 and 67 in the other leg of the fork. The bores 66 and 67 are coaxial and of equal diameter. In each bore 66, 67 is disposed a cylindrical brake shoe 68, 69, respectively, which is disposed freely in its receiving bore so that it may move axially and rotate freely therein. There is no connection other than a bearing engagement between the cylindrical portions 58, 59 of each actuating piston and its adjacent brake shoe 68, 69, respectively. The cylindrical brake shoes 68 and 69 are coaxial with each other and with their actuating pistons. The fit between each cylindrical brake shoe and its receiving bore, although a free sliding fit, is nevertheless sufficiently close to maintain in alignment the central axis of the brake shoe and the axis of its receiving bore so that the brake shoes are maintained in coaxial relation and hence with their faces parallel. The brake shoes 68, 69 are made of rigid, high friction material having a high metallic content, which material is readily available commercially.

A circular metal brake disc 70 is mounted with its peripheral portion extending into the slot 71 between the brake shoes 68, 69. The circular brake disc 70 is fixedly attached to a hub 72 which extends a substantial distance radially outwardly from the shaft 73 in order to stiffen the brake disc 70 and inhibit undue deflection thereof from its plane of rotation. The hub 72 is fixed to the shaft 73 in conventional manner, as with a key, so that the brake disc 70, hub 72, and shaft 73 rotate as a unit.

Through rotation of adjustment screws 47 and 48, the clearance of the braking surfaces of the brake shoes 68 and 69 from the adjacent surface of the brake disc 70 may be adjusted to a close tolerance. Such clearance of the braking surfaces of the brake shoes from the adjacent surface of the brake disc is adjusted to be equal for each of the brake shoes so that equal axial displacements of the brake shoes toward each other result in an equal frictional engagement between the brake shoes and the surface of the brake disc 70. When braking is desired, the bell crank 29 is moved in the direction indicated with the arrow 33 with conventional mechanical linkage connected to a brake pedal on the vehicle. This causes piston 24 to move upwardly, and consequently the two pistons 36 and 37 to move outwardly. Due to the larger area of the pistons 36 and 37 relative to the area of the piston 24, the total force applied to the protrusions 51, 52 of the actuating levers is magnified. The outward movement of the pistons 36, 37 results in the ends 54, 55 of the actuating levers moving inwardly to cause the brake shoes 68 and 69 to frictionally engage both sides of the brake disc 70 simultaneously and equally. When braking action is no longer desired, the bell crank 29 is released and the cone springs 64 and 65, compression spring 40, and compression spring 27 all coact to return the mechanism to normal unactuated position. Since the brake shoes 68, 69 float in their receiving bores 66, 67, they are free to rotate, and their rotation is induced when the brake is actuated. This random rotation of the brake shoes 68, 69 results in an even distribution of wear over their braking surfaces which is advantageous for the reasons explained in the introductory portion of the application. Due to the adjustment screws 47, 48, it is possible to set the brake shoes very closely to the brake disc 70 and to space each brake shoe the same amount from the brake disc 70 so that when the brake is actuated, the disc 70 is gripped evenly on both sides and is not deflected in one direction or the other, which is advantageous as explained in the introductory portion of the specification.

I claim:

1. A spot disc brake comprising a housing defining a slot adapted to receive a rotating brake disc to be braked, a cylindrical brake shoe disposed in the housing on each side of the slot with its circular face exposed in the slot for frictional engagement with the brake disc, said brake shoes being coaxially aligned and received in the housing for free rotational and free axial movement, said housing defining a first cylindrical bore in spaced relation from the brake shoes and with its axis extending in the same direction as the common axis of the brake shoes, a pair of spaced pistons slidably disposed in the first bore, said housing defining a second cylindrical bore having a closed end, a piston slidably disposed in the second bore in spaced relation from the closed end of the second bore, said housing defining a passageway communicating from the second bore adjacent the closed end thereof to the first bore between the pistons therein, means operable exteriorly of the housing for moving the piston in the second bore, a pair of actuating levers on the housing, one actuating lever extending between one brake shoe and the piston in the first bore on the same side of the housing as that brake shoe with one end operatively connected to that brake shoe and with a portion spaced along the actuating lever from that end operatively connected to that piston in the first bore and the other actuating lever extending between the other brake shoe and the piston in the first bore on the same side of the housing as that brake shoe with one end operatively connected to that brake shoe and with a portion spaced along the actuating lever from that end operatively connected to that piston in the first bore, pivot mountings on the housing for the actuating levers, said pivot mountings pivotally mounting the actuating levers on the housing with pivot axes transverse to the common axis of the brake shoes and located on each actuating lever between the operative connections of the actuating lever to the brake shoe and to the piston in the first bore, the pivot axes of the actuating levers being aligned with each other in the direction of the common axis of the brake shoes, each said actuating lever having a portion extending from its portion operatively connected to the piston in the first bore to an end adjacent to and spaced from the housing, and a screw threadedly received in the end of each extension of each actuating lever extending through the actuating lever with the axis of the screw transverse to the pivot axis of the actuating lever and with an end of the screw bearing against the housing to permit the angular position of the actuating lever about its pivot axis to be varied and preselected through rotation of the screw.

2. A spot disc brake comprising a housing defining a slot adapted to heceive a rotating brake disc to be braked, said housing defining coaxial cylindrical openings on each side of the slot extending through the housing transverse to the slot from the exterior thereof to the slot, a cylindrical brake shoe disposed in each opening with one circular face exposed in the slot for frictional engagement with the brake disc, said brake shoes being coaxial along an axis transverse to the slot and being disposed in their receiving openings for free rotation and free axial movement, an actuating piston disposed in each opening with one end bearing concentrically on the other circular face of the brake shoe disposed in that opening and with the other end exposed exteriorly of the housing, a compression spring for each actuating piston disposed in each opening with one end engaging the housing and the other end engaging the actuating piston in that opening and biasing the actuating piston away from the slot in the housing, said housing defining a first cylindrical bore extending through the housing in spaced relation from the brake shoes and with its axis extending in the same direction as the common axis of the brake shoes, a pair of pistons disposed in the first bore in slidable engagement therewith and spaced from each other, a compression spring disposed between the pair of pistons in the first bore and engaging the interior end of each such piston and biasing them outwardly away from each other, said housing defining a second cylindrical bore having a closed end, a piston slidably disposed in the second bore, a compression spring extending between the closed end of the second bore and the interior end of the piston disposed therein engaging each and biasing such piston away from the closed end of the second bore, means operable exteriorly of the housing for moving the piston in the second bore toward the closed end of the second bore, said housing defining a passageway communicating from the second bore at a point adjacent the closed end thereof to the first bore at a point intermediate the pistons disposed therein, an actuating lever on each side of the housing extending between the actuating piston on that side of the housing and the piston in the first bore on that side of the housing with one end engaging the exterior end of that actuating piston, a protrusion on each actuating lever spaced from the end thereof engaging the actuating piston and extending inwardly toward the housing to engage the piston in the first bore on that side of the housing, a pivot mount on each side of the housing pivotally mounting the actuating lever on that side of the housing at a point between its end engaging the actuating piston and its protrusion engaging the piston in the first bore with a pivot axis transverse to the common axis of the brake shoes, an extension of each actuating lever extending from the protrusion thereof to an end spaced from the exterior surface of the housing, a screw threadedly received in the end of each such extension of each actuating lever and extending through the actuating lever with the axis of the screw transverse to the pivot axis of the actuating lever and engaging the exterior surface of the housing, and means on each screw for releasably preventing rotation of such screw relative to the actuating lever.

3. A spot disc brake comprising a housing defining a slot adapted to receive a rotating brake disc to be braked, said housing defining coaxial cylindrical openings on each side of the slot extending through the housing transverse to the slot from the exterior thereof to the slot, a cylindrical brake shoe disposed in each opening with one circular face exposed in the slot for frictional engagement with the brake disc, said brake shoes being coaxial along an axis transverse to the slot and being disposed in their receiving openings for free rotation and free axial movement, an actuating piston disposed in each opening with one end bearing concentrically on the other circular face of the brake shoe disposed in that opening and with the other end exposed exteriorly of the housing, a compression spring for each actuating piston disposed in each opening with one end engaging the housing and the other end engaging the actuating piston in that opening and biasing the actuating piston away from the slot in the housing, said housing defining a first cylindrical bore extending through the housing in spaced relation from the brake shoes and with its axis extending in the same direction as the common axis of the brake shoes, a pair of pistons disposed in the first bore in slidable engagement therewith and spaced from each other, a compression spring disposed between the pair of pistons disposed in the first bore and engaging the interior end of each such piston and biasing them outwardly away from each other, said housing defining a second cylindrical bore of smaller diameter than the first bore and having a closed end, a piston slidably disposed in the second bore, a compression spring extending between the closed end of the second bore and the interior end of the piston disposed therein engaging each and biasing such piston away from the closed end of the second bore, means operable exteriorly of the housing for moving the piston in the second bore toward the closed end of the second bore, said housing defining a passageway communicating from the second bore at a point adjacent the closed end thereof to the first bore at a point intermediate the pistons disposed therein, an actuating lever on each side of the housing extending between the actuating piston on that side of the houisng and the piston disposed in the first bore on that side of the housing with one end engaging the exterior end of that actuating piston, a protrusion on each actuating lever spaced from the end thereof engaging the actuating piston and extending inwardly toward the housing to engage the piston in the first bore on that side of the housing, a pivot mount on each side of the housing pivotally mounting the actuating lever on that side of the housing at a point between its end engaging the actuating piston and its protrusion engaging the piston in the first bore with a pivot axis transverse to the common axis of the brake shoes, an extension of each actuating lever extending from the protrusion thereof to an end spaced from the exterior surface of the housing, a screw threadedly received in the end of each such extension of each actuating lever and extending through the actuating lever with the axis of the screw transverse to the pivot axis of the actuating lever and engaging the exterior surface of the housing, means on each screw for releasably preventing rotation of such screw relative to the actuating lever, said housing defining a chamber communicating to the exterior of the housing, a removable cap closing the communication of the chamber to the exterior of the housing, said housing defining a passageway communicating from the chamber to the second bore at a point between the closed end of the second bore and the interior end of the piston in the second bore and adjacent to the interior end of such piston in unactuated position.

References Cited in the file of this patent

UNITED STATES PATENTS

| | | |
|---|---|---|
| 1,995,135 | Williams et al. | Mar. 19, 1935 |
| 2,164,551 | Swennes | July 4, 1939 |
| 2,672,956 | Webb et al. | Mar. 23, 1954 |
| 2,731,112 | Berrows | Jan. 17, 1956 |
| 2,785,710 | Mowery | Mar. 19, 1957 |
| 3,024,873 | Wilkinson | Mar. 13, 1962 |

FOREIGN PATENTS

| | | |
|---|---|---|
| 455,505 | Italy | Mar. 2, 1950 |
| 187,572 | Switzerland | Apr. 1, 1937 |